US006447024B1

(12) United States Patent
Olson

(10) Patent No.: US 6,447,024 B1
(45) Date of Patent: Sep. 10, 2002

(54) SPRING RETAINER CLIP FOR A QUICK-CONNECT COUPLING

(75) Inventor: Darwin Olson, Franklin, TN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/876,178

(22) Filed: Jun. 8, 2001

(51) Int. Cl.[7] .................................................. F16L 21/08
(52) U.S. Cl. ........................................ 285/319; 285/322
(58) Field of Search ................................ 285/243, 322, 285/323, 319

(56) References Cited

U.S. PATENT DOCUMENTS

| | | | | |
|---|---|---|---|---|
| 2,477,849 A | | 8/1949 | Adams | |
| 3,810,073 A | | 5/1974 | Zajac | |
| 4,045,055 A | * | 8/1977 | Blakely | 285/110 |
| 4,304,426 A | * | 12/1981 | Francis | 285/323 |
| 4,828,297 A | | 5/1989 | Tarum | |
| 4,836,580 A | * | 6/1989 | Farrell | 285/133.11 |
| 4,925,217 A | | 5/1990 | Ketcham | |
| 5,029,908 A | * | 7/1991 | Belisaire | 285/319 |
| 5,042,848 A | * | 8/1991 | Shiozaki | 285/277 |
| 5,163,719 A | | 11/1992 | Washizu | |
| 5,195,787 A | | 3/1993 | Bartholoew | |
| 5,275,448 A | | 1/1994 | McNaughton et al. | |
| 5,707,085 A | | 1/1998 | Kubiak | |
| 5,738,387 A | * | 4/1998 | Guest | 285/322 |
| 5,909,902 A | * | 6/1999 | Seabra | 285/322 |
| 5,934,713 A | * | 8/1999 | Guest | 285/322 |
| 6,267,416 B1 | | 7/2001 | Ferreira et al. | |
| 6,349,978 B1 | * | 2/2002 | McFarland et al. | 285/319 |

FOREIGN PATENT DOCUMENTS

| | | |
|---|---|---|
| CA | 2217508 | 4/1998 |
| EP | 0843121 A1 | 5/1998 |

* cited by examiner

*Primary Examiner*—Eric K. Nicholson
(74) *Attorney, Agent, or Firm*—Millen, White, Zelano & Branigan, P.C.

(57) ABSTRACT

A spring retainer clip used with a quick-connect coupling for coupling a male connector having an outwardly extending protrusion in a bore of a female connector having an inwardly extending protrusion wherein the outwardly and inwardly extending protrusions are separated by an annular gap. The spring retainer clip comprises a ring having an axially extending collar for fitting around the male connector and a radially extending base unitary with the collar. A plurality of spring arms, unitary with and extending axially from the radially extending base, have transverse T-bars at free ends thereof adapted to extend through the gap between the protrusions and block movement of the protrusions past one another. Consequently, the male and female connectors cannot be separated if the width of the gap is substantially reduced. Tabs on the base between the spring arms extend axially to engage the bore in the female connector so as to stabilize the spring retainer clip within the bore when the T-bars are disposed in the gap and when the base and collar are disposed outside of the bore. In order to have an more robust configuration with a relatively thick collar and thick base, the spring retainer clip is molded of powdered steel.

16 Claims, 1 Drawing Sheet

90
12
96
84
93
96
90
93
82
93
80
90
96
93
91
96
90

SPRING RETAINER CLIP FOR A QUICK-CONNECT COUPLING

FIELD OF THE INVENTION

The present invention is directed to a spring retainer clip for a quick-connect coupling. More particularly, this invention is directed to spring retainer clip for a quick-connect coupling which is useful for heavy duty applications.

BACKGROUND OF THE INVENTION

There is a constant need for improvements in quick-connect couplings in order to decrease costs, simplify use and maintain reliability. With heavy duty connections such as connections for oil coolers used with truck transmissions, there is a need for quick connects which provide for faster assembly. In addition to faster assembly, it is desirable to have improved performance in the form of higher tensile performance, higher side load resistance and better seal performance. There are quick-connect configurations currently available which are of an inexpensive construction, but they are generally made of stamped spring steal of a constant thickness and therefore do not provide structures which are robust enough to withstand the vigor's of high stress environments such as those experienced by vehicles such as trucks which have transmission oil coolers. These oil coolers are subject to large thermal variations, vibration and debris which when combined compromise the reliability of conventionally configured spring retainer clips used with quick-connect couplings.

SUMMARY OF THE INVENTION

In view of the aforementioned considerations, the present invention is directed to a spring retainer clip for a quick-connect coupling for coupling a male connection having an outwardly extending protrusion in a bore of a female connection having an inwardly extending protrusion, wherein the outwardly and inwardly extending protrusions are separated by an annular gap. The spring clip comprises a ring having an axially extending collar for fitting around the male connection and a radially extending base unitary with the collar. A plurality of spring arms, which are unitary with and extend axially from the radially extending base, have transverse T-bars at the free ends thereof adapted to extend through the gap between the protrusions for blocking movement of the protrusions past one another. Tabs are located on the base between the spring arms and extend axially to engage the bore to thereby stabilize the spring retainer clip within the bore when the T-bars are disposed in the gap with the base and collar disposed outside of the bore.

In a further aspect of the invention, the spring clip retainer is a unitary structure of molded metal, wherein the molded metal is powdered steel.

In still a further aspect of the invention, the base and collar of the ring have a thickness substantially greater than that of the spring arms.

DETAILED DESCRIPTION

Figure 1:
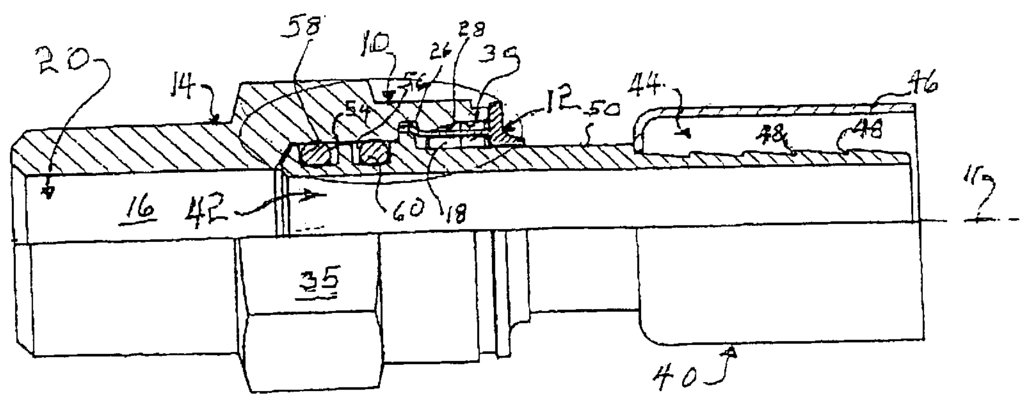
FIG. 1 is a side view, partially in elevation, showing a spring retainer clip of the present invention coupling together male and female fluid connectors.
Figure 2:
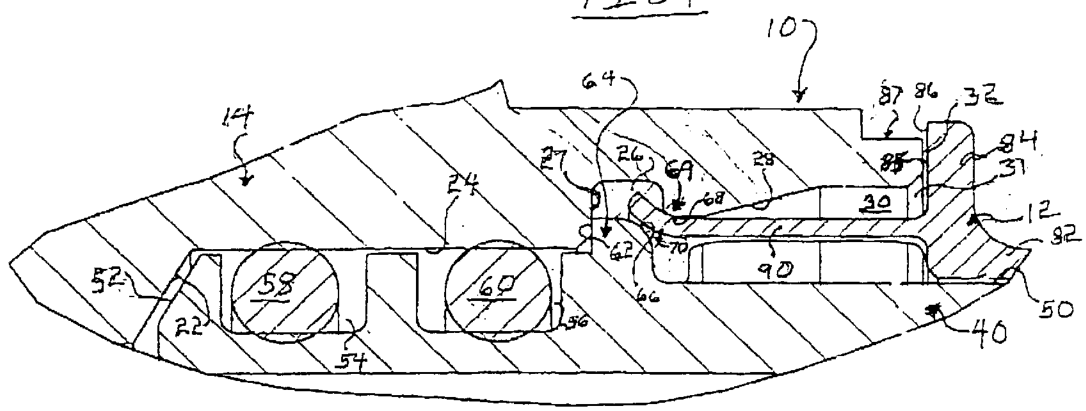
FIG. 2 is an enlarged side elevation of a portion of FIG. 1.

Referring now mainly to FIGS. 1 and 2, there is shown a quick-connect coupling 10 formed around an axis 11, which coupling 10 utilizes a spring retainer clip 12, configured in accordance with the principles of the present invention. The quick-connect coupling includes a female quick connector 14 having a stepped bore 16 therethrough, which bore has a first end 18 and a second end 20. The female quick connector 14 can also be part of a unitary body having the female connector structure within and unitary therewith. The second end 20 of the stepped bore 16 has a larger diameter and is separated from the first end 18 by a slanted shoulder 22. The slanted shoulder 22 is preceded by a cylindrical section 24 which is in turn preceded by an annular groove 26 having as one wall a radial surface 27. Just in front of the annular groove 26 there is a ramp 28, and in front of the ramp 28 there is a second cylindrical section 30. Cylindrical section 30 flares slightly to provide a frustoconical entrance surface 31 to the bore 16. A flat radially extending surface 32 extends radially with respect to the axis 11 of the coupling. The female connector 14 has a hex nut portion 35 to facilitate gripping the female connector with a wrench.

Slidably disposed within the stepped bore 16 of the female connector 14 is a male quick connector 40. The male connector 40 includes the first end which is received in the first end 18 of the bore 16 of the female connector 14 and a second end 44 around which a hose (not shown) is crimped by a crimping collar 46 which urges the hose into engagement with annular teeth 48. In another embodiment (not shown) the second end 44 can couple with a metal tube rather than a hose. Alternatively, the male quick connector could be a body having the connector projecting therefrom an integral or unitary therewith.

Joining the first end 42 and the second end 44 is a cylindrical intermediate portion 50 around which the spring retainer clip 12 is positioned.

The first end or insertion end 42 of the male connector 40 includes frustoconical end face 52 which faces but normally does not touch the frustoconical shoulder 22 of the female connector 14. Disposed in board of the end face 52 of the male connector 40 are first and second annular grooves 54 and 56 which receive O-rings 58 and 60 respectively. The O-rings 58 and 60 seal with the cylindrical surface 24 in the stepped bore 16 of the female connector 14. A stepped annular shoulder 62 projects radially from the male connector 40 and engages the radial surface 27 of the annular groove 26 to stop axial movement of the male connector 40 when inserted into the stepped bore 16 of the female connector 14. The shoulder 62 is on a protrusion 64 that has a rounded surface 66 which is obliquely spaced from rounded annular surface 68 on protrusion 69 where the frustoconical surface 28 of the female connector meets the groove 26. This creates a gap 70 in which the spring retainer clip 12 is positioned so as to block withdrawal of the male connector 40 from the stepped bore 16 of the female connector 14.

Figure 3:
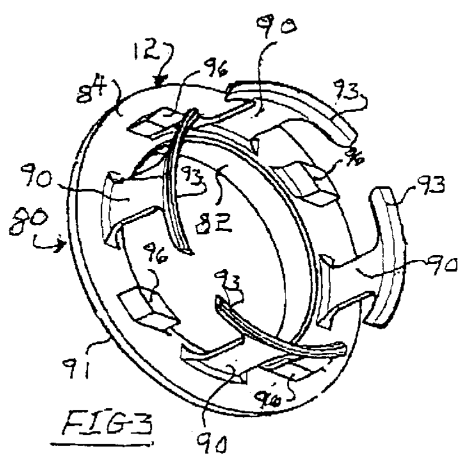
FIG. 3 is perspective view of a spring retainer clip configured in accordance with the principles of the present invention.

Referring now to FIG. 3 in combination with FIGS. 1 and 2 where the spring retainer clip 12 is shown in detail, it is seen that the spring retainer clip includes a ring 80 comprised of an axially extending collar 82 and a radially extending base 84 which are fixed with respect to one another. The collar 82 stabilizes the clip 12 on the cylindrical portion 50 of the male connector 40 while the base 84 extends radially with a diameter greater than the diameter of the first end 18 of the bore 16, as defined by the frustoconical entrance surface 31, so as to block entry of debris into the bore. The base 84 has an abutment surface 85 that directly faces the radially extending surface 32 on the female connector 14 and extends a slight radial distance beyond the surface 32. Consequently there is a radial lip portion 86 which is engageable by a tool inserted in a notch 87 in the female connector 14 to facilitate applying an axial force to the lip portion 86 of the spring clip 12. This enables one to pull the spring clip 12 out of the bore 16 when the male connector 40 is pressed into the bore so that the annular shoulder 62 abuts the annular shoulder 27 and widens the gap 70 providing clearance for removal of the spring retainer clip 12.

The spring retainer clip 12 has four axially extending spring arms 90 equally spaced around the base 84. The spring arms 90 are positioned a distance "d" from the peripheral edge 91 of the base 84 so that they pass readily into the bore 16 and can be cammed by the frustoconical surface 28 inwardly so as to pass into and then snap past the gap 70.

Each spring arm 90 has an arcuate T-bar 93 at the free end thereof. Each T-bar 93 is canted so as to slope outwardly in an oblique direction with respect to the axially extending spring arm 90 mounting the T-bar. Consequently, as seen in FIGS. 1 and 2, the T-bars 93 extend into the annular groove 26 of the female member 14. Since the T-bars 93 are biased to FIG. 2 position, when the male and female connectors 40 and 14 are pulled in opposite directions, the annular shoulders 66 and 68 engage the T-bars so as to interfere with withdrawal of the male connector 40 from the bore 16 of the female connector 14. However, if it is desired to decouple the male connector 40 from the female connector 14, the male connector is shoved in until the shoulder 62 and 27 abut, widening the gap 70. At that time when the spring retainer clip 12 is pulled, the spring arms 90 deflect inwardly so that the spring arms can be withdrawn from the gap 70. The T-bars 93 then engage the frustoconical surface 28 allowing axial withdrawal of the spring retainer clip 12 from the female connector 14. Once the spring retainer clip 12 is removed from the gap 70, the protrusions 64 and 69 can clear one another allowing the male connector 40 to slide out of the female connector 14.

In order to stabilize the spring retainer clip 12 while it is within the bore 16, four tabs 96 are disposed on the base 84 and project in an axial direction. The tabs 96 are also spaced a distance "d" from the periphery 91 of the collar 84 so that they slide into bore 16, engage the second cylindrical portion 30 of the female connector 14, and thus discourage radial shifting of the spring clip 12.

Preferably, the spring clip 12 is molded of powdered steel, consequently, it is feasible to have different thicknesses for the various components of the spring retainer clip. As is seen in FIGS. 2 and 3, the base 84 and collar 82 are substantially thicker than the spring arms 90, as are the tabs 96. This enables a more robust spring retainer clip 12 than one which formed by stamping.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A spring retainer clip for use with a quick-connect coupling for coupling a male connector having an outwardly extending protrusion in a bore of a female connector having an inwardly extending protrusion, wherein the outwardly and inwardly extending protrusions are separated by an annular gap, the spring retainer clip comprising:

a ring having an axially extending collar for fitting around the male connector and a radially extending base unitary with the collar;

a plurality of spring arms unitary with and extending axially from the radially extending base, the spring arms having transverse T-bars at free ends thereof adapted to extend through the gap between the protrusion to block movement of the protrusions past one another, and tabs on the base between the spring arms, the tabs extending axially to engage the bore so as to stabilize the spring retainer clip with the bore when the T-bars are disposed in the gap and the base and collar are disposed outside of the bore.

2. The spring retainer clip of claim 1 wherein the T-bars are slanted outwardly with respect to the spring arms.

3. The spring retainer clip of claim 2 wherein the T-bars are arcuate.

4. The spring clip retainer of claim 3 wherein the spring clip retainer is a unitary structure of molded metal.

5. The spring clip retainer of claim 4 wherein the molded metal is powdered steel.

6. The spring clip retainer of claim 1 wherein the collar and spring arms extend from the base in opposite directions.

7. The spring clip retainer of claim 1 wherein there are four spring arms and four tabs.

8. The spring clip retainer of claim 1 wherein the spring clip retainer is a unitary structure of molded metal.

9. The spring clip retainer of claim 8 wherein the molded metal is powdered steel.

10. The spring clip of claim 1 wherein the base and collar have a thickness substantially greater than the spring arms.

11. A unitary spring retainer clip usable with a quick-connect coupling for coupling a male connector having an outwardly extending protrusion in a bore of a female connector having an inwardly extending protrusion, wherein the outwardly and inwardly extending protrusions are separated by an annular gap, the spring retainer clip comprising:

a ring having an axially extending collar for fitting around the male connector and a radially extending base unitary with the collar, the ring and collar being of selected thicknesses;

a plurality of spring arms unitary with and extending axially from the radially extending base, the spring arms having transverse T-bars at free ends thereof adapted to extend through the gap between the protrusion to block movement of the protrusions past one another, the spring arms having thickness less than the thicknesses of the ring and collar, and tabs on the base between the spring arms, the tabs extending axially to engage the bore so as to stabilize the spring retainer clip with the bore when the T-bars are disposed in the gap and the base and collar are disposed outside of the bore.

12. The spring retainer clip of claim 11 wherein the T-bars are arcuate and are slanted outwardly with respect to the spring arms.

13. The spring clip retainer of claim 11 wherein the unitary spring clip retainer is made of molded metal.

14. The spring clip retainer of claim 13 wherein the molded metal is powdered steel.

15. The spring clip retainer of claim 11 wherein the collar and spring arms extend from the base in opposite directions.

16. The spring clip retainer of claim 11 wherein there are four spring arms and four tabs.

* * * * *